Figure 1:
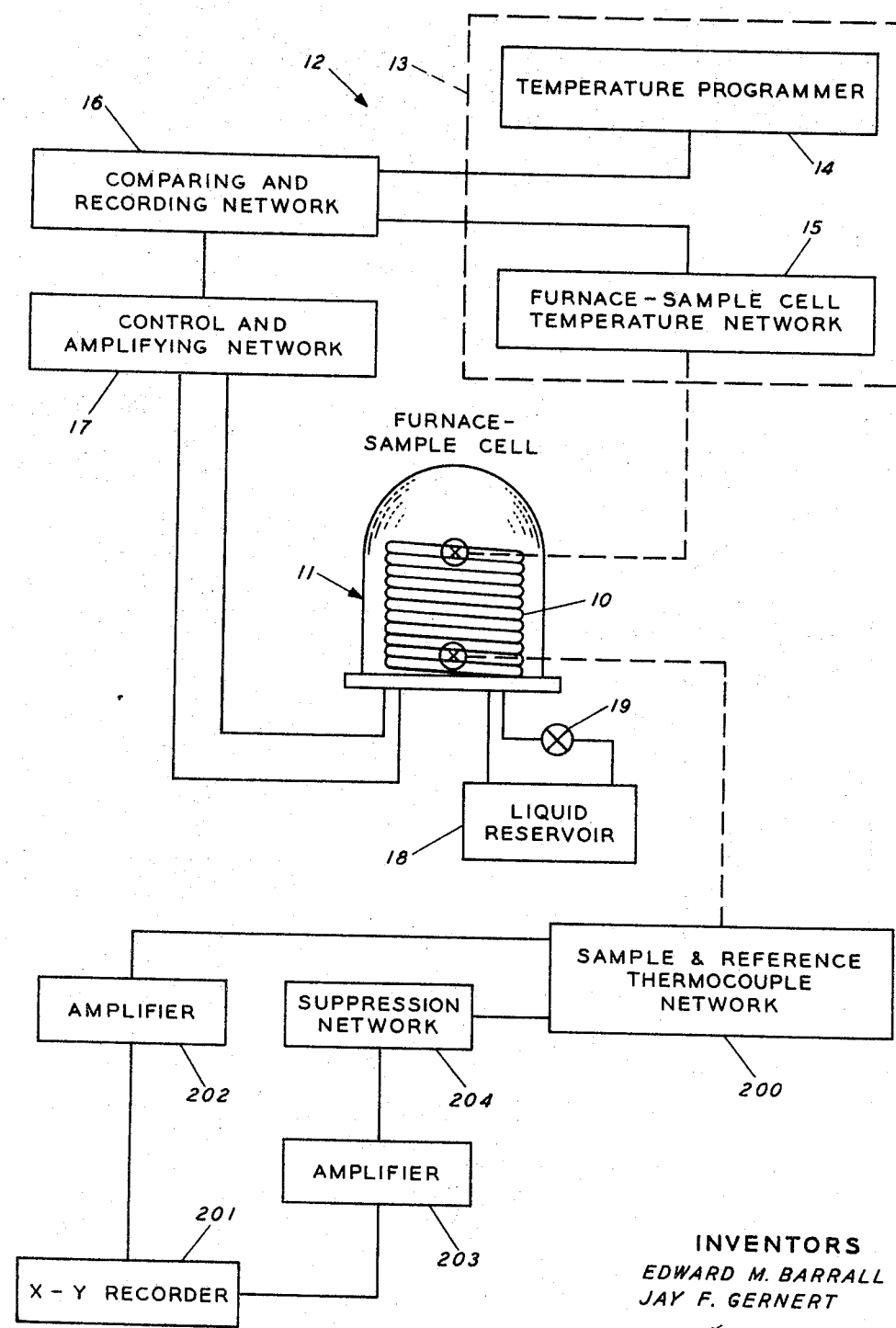

INVENTORS
EDWARD M. BARRALL II
JAY F. GERNERT

INVENTORS
EDWARD M. BARRALL II
JAY F. GERNERT

Sept. 5, 1967  E. M. BARRALL II, ET AL  3,339,398
HIGH SENSITIVITY DIFFERENTIAL THERMAL
ANALYSIS APPARATUS AND METHOD
Filed March 30, 1964  4 Sheets-Sheet 3

INVENTORS
EDWARD M. BARRALL II
JAY F. GERNERT

BY
ATTORNEYS

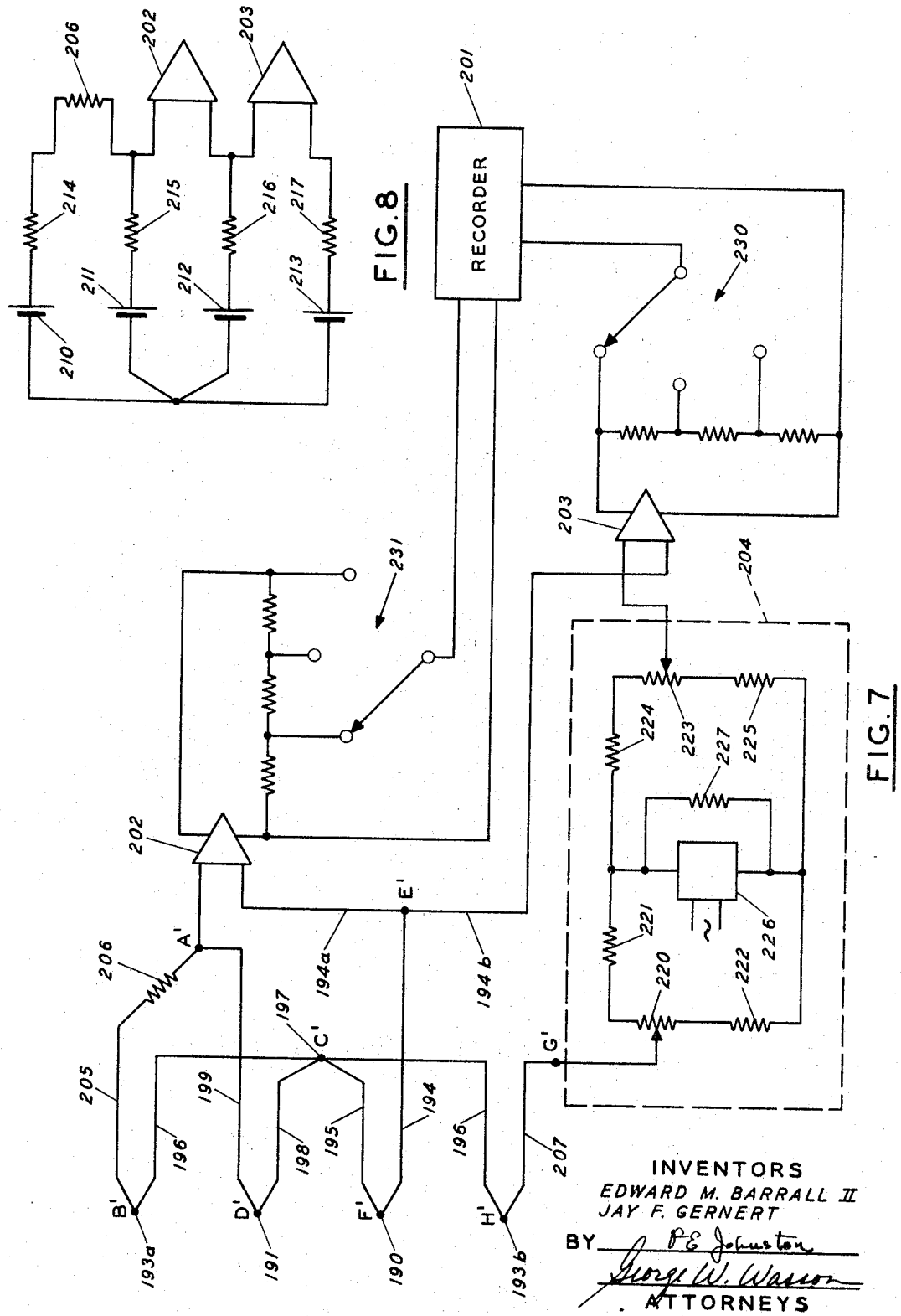

United States Patent Office 3,339,398
Patented Sept. 5, 1967

3,339,398
HIGH SENSITIVITY DIFFERENTIAL THERMAL ANALYSIS APPARATUS AND METHOD
Edward M. Barrall II, Terra Linda, and Jay F. Gernert, Pacheco, Calif., assignors to Chevron Research Company, a corporation of Delaware
Filed Mar. 30, 1964, Ser. No. 355,604
18 Claims. (Cl. 73—15)

This invention relates to thermal analysis of organic and polymer materials and more particularly to an apparatus and method for rapidly, accurately and automatically determining thermal absorption and emission properties of such materials using differential thermal analysis. In one aspect of the invention, automatic control of a time-varying temperature supplied to a sample of organic or polymer material is achieved by electrical systems providing proportional control, reset action and rate action in the operation of the temperature-producing means. A feature of the invention is that the control of the temperaure variable such as that associated with a heating coil is achieved over a wide range of temperatures (−100 to 500° C.) with deviations of temperature variables from a standard being less than ±.05° C./min. Another aspect of the invention is that variations in temperature between a heated sample and a reference material are accurately measured to deviations less than ±.05° C. by means of a measuring system that provides low-thermocouple drift and high-display sensitivity.

Differential thermal analysis (DTA) is an analytical method used in the fields of geology, geo-chemistry and organic chemistry for the measurement of phase transition chemical reactions of various materials. Basically, the method requires the measurement of a temperature differential (ΔT) between a sample and a reference material (the reference material does not undergo a transition within the temperature range of interest) as a function of the temperature (T) of the sample as both sample and reference are heated or cooled simultaneously at a linear rate. The temperature differential (ΔT) is constant until the sample undergoes a thermal transition that either accelerates or retards its rate of temperature change. Although differential thermal analysis has been utilized in conjunction with both organic and inorganic compounds, experience has shown that the method is often unsatisfactory in terms of speed, sensitivity, precision and display resolution where the transitions of interest involve very small amounts of energy as associated with many of today's polymer materials. Although recent depelopments in the art have suggested that improvements in sensitivity could be obtained by modifications to the sample cell to minimize high heat effects that obscure the interactional effects sought to be observed, see for example U.S. Patent No. 3,117,438, J. C. Harden et al., for "Differential Thermal Analysis Apparatus," issued Jan. 14, 1963, there remain applications in which such modifications do not produce the desired sensitivity and precision required to satisfactorily analyze thermal transitions of many polymer materials.

In accordance with one aspect of the invention, automatic control of the linear heat rate applied to furnace heating coils of a differential thermal analysis apparatus is achieved by means of a novel electrical heating system including closed-loop control networks providing proportional, reset and rate control of the heat rate as a function of furnace temperature. In the system, a first signal voltage responsive to a given temperature at the furnace is dynamically compared with a second signal voltage produced by a rate adjustment of a slidewire resistor shunting a direct current source means to adjust a circuit element in a second network such as a slidewire resistor to produce a voltage whose magnitude is the difference in the signals. The input voltage of the second network varies a compensating circuit element such as a slidewire resistor in the network. The compensating element produces a third signal voltage in a third network used to adjust the temperature at the furnace. The arrangement is such that upon the production of the first voltage, the third network is adjusted to vary the signal voltage to the furnace until the signal voltage proportional to the temperature in the furnace is equal and opposite in magnitude to the rate-generated voltage. Thus a voltage balance is produced in the first and third networks in the manner of proportional control action with the provision of wide range of rate programming (−100 to 500° C.) in the first network as well as high sensitivity to changes in and mitigating control of deviations from a desired signal level in the second network. In addition, by means of a resistor and capacitors in the third network, there is also provided control of the third signal voltage in a manner that responds to the summation of the deviations of that voltage from the second voltage (reset control action) as well as to the differential of the deviations of that voltage from the second voltage (rate control action).

In accordance with another aspect of the invention, changes in temperature differential (ΔT) between the sample and a reference material are measured and recorded as a function of the temperature (T) of the sample by a measuring system that includes a set of four thermocouples connected in shunt with the sample, reference and a reference point forming a cold junction for producing first and second signal voltages corresponding to the temperature of the sample and the temperature differential between the sample and the reference. A recorder for displaying the differential temperature as a function of the sample temperature is provided by way of first and second amplifiers and voltage divider means serially attached between the thermocouples and the recorder. By means of a zero suppression circuit interconnecting the first amplifier with a slidewire resistor in the recorder, the system also allows the sample temperature range to be expanded and amplified without changing the circuit impedance at the first amplifier.

In a further aspect of the invention, extraneous heat loss or gain to a sample material not measurable by thermocouples is minimized by forming the furnace-cell with sample and reference cuvettes that are an integral part of the thermocouple measuring circuits. In that manner, differences in heat conductivity between sample, reference and cuvettes are averaged over the entire surface of the cuvette so that changes in temperature recorded by the thermocouples truly reflect the thermal characteristics of sample or reference materials under measurement.

Figure 2:
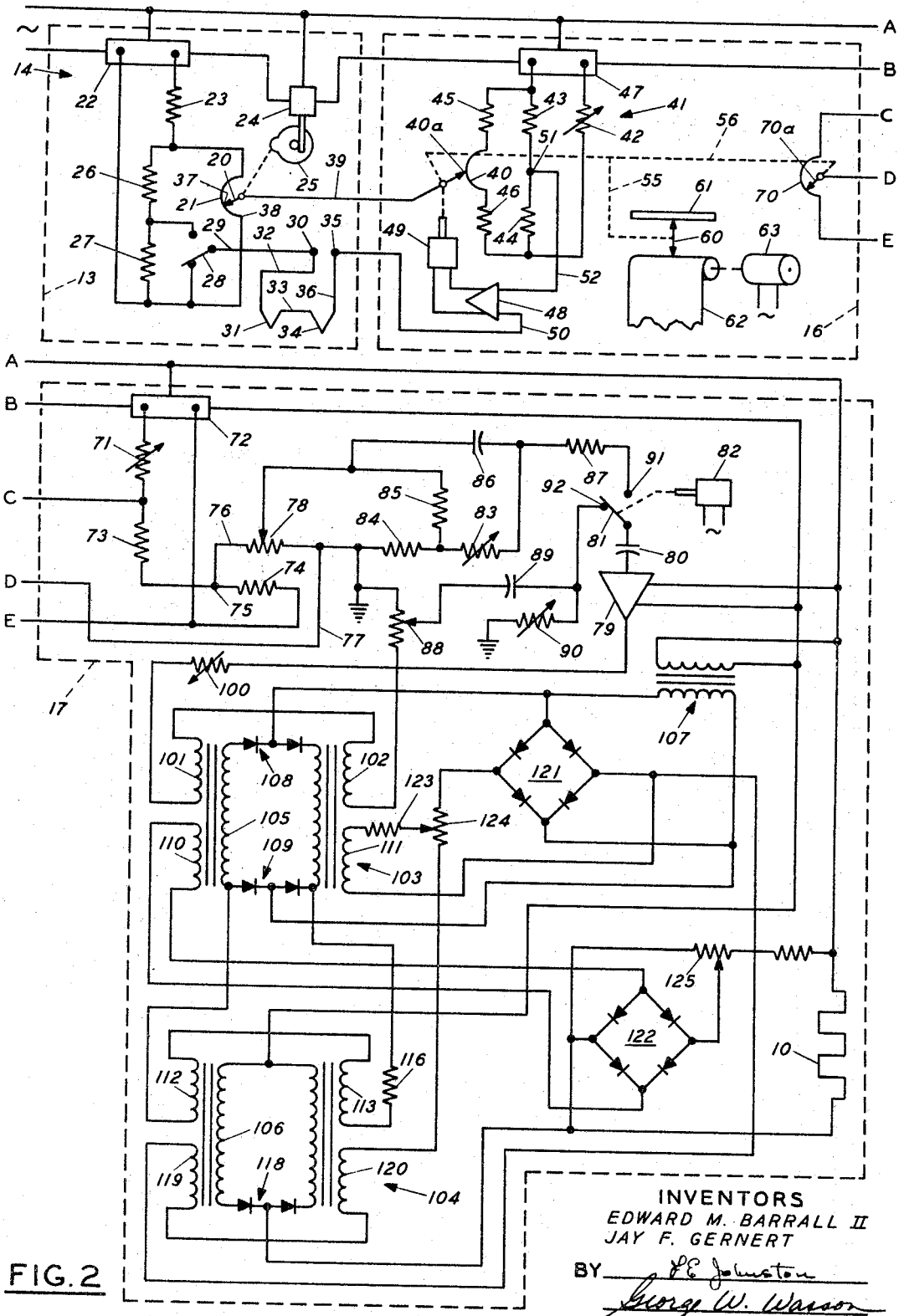
Figure 4:
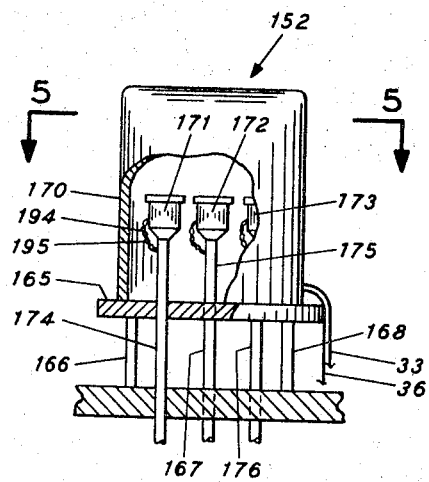
Figure 5:
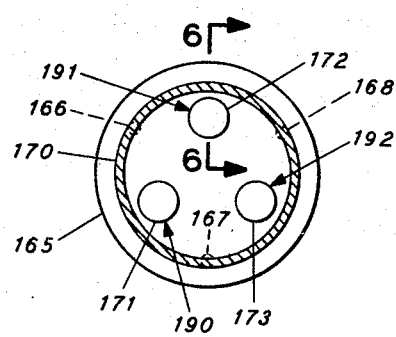
Figure 6:
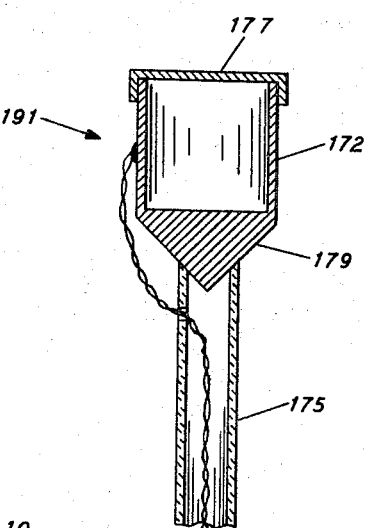
Figure 3:
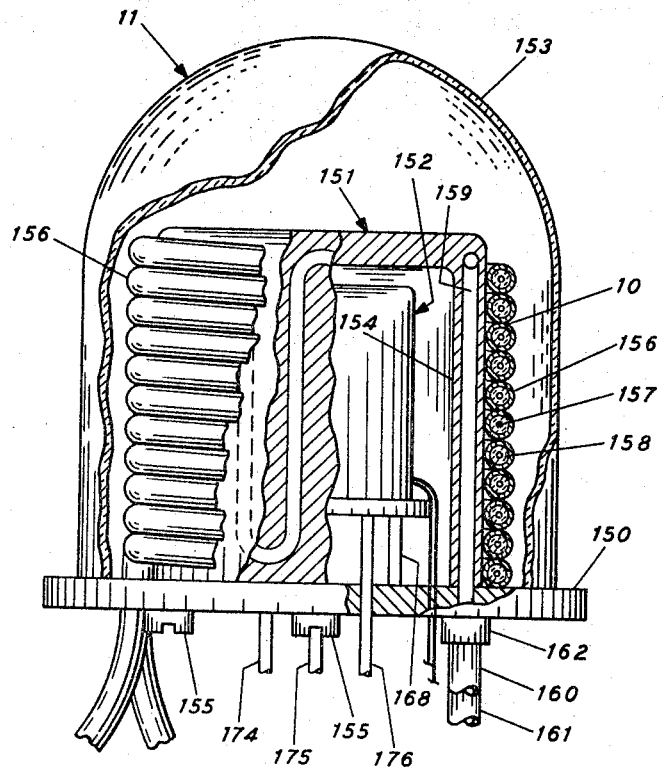

Other objects and advantages of the invention will be apparent from the following detailed description, with reference to the accompanying drawings, in which:

FIGURE 1 is a block diagram of a systemized apparatus for performing differential thermal analysis;
FIGURE 2 is a schematic circuit diagram of a heating-control network for the apparatus of FIGURE 1;
FIGURE 3 is side elevation, partially cut-away, of a furnace-sample cell for use in conjunction with the heat-control network of FIGURE 2;
FIGURES 4, 5 and 6 are fragmentary diagrams of features of the furnace-sample cell of FIGURE 3;
FIGURE 7 is a schematic circuit diagram of a display-recording network for the apparatus of FIGURE 1; and
FIGURE 8 is an equivalent circuit diagram of the temperature-measuring network of the display-recording network of FIGURE 7.

Determination of phase transition temperatures of homo- and copolymer materials by differential thermal analysis requires combined components that perform three separately distinguished but ultimately combined functions, namely, (1) circuitry that very uniformly heats the sample and reference materials in accordance with a predetermined program, (2) sample cell and furnace geometry that does not change nonlinearly upon application of different rates of heat application and (3) display and recording circuitry for sensing temperature changes to a high degree of accuracy. Each requirement is singly important, for only by proper control by each component can the detection of very small shifts in measured temperature of the sample and reference (indicating phase transitions) be achieved.

*Circuitry for uniformly heating the sample and reference materials*

In accordance with the invention, automatic control of a linear heat rate program applied to a set of heating coils 10 disposed in furnace-cell 11 is achieved by means of a novel electrical heating and control system schematically indicated at 12 in FIGURE 1. The heat-control system includes a programmer-indicator network 13 comprising a temperature programmer 14 shunting temperature indicating means 15 disposed within the furnace-cell, a comparison-recording control network 16 serially connected to the programmer-indicator network, and a control-amplifying network 17 interconnecting the comparison-recording network and the furnace-cell 11. The initial test temperature—called zero registry—of the furnace-cell is controlled by means of a valve 19 for circulating a cooling medium through the cell from liquid reservoir 18. As the programmer 14 generates a signal voltage proportional to a temperature desired in furnace-cell 11, heat is generated and raises the temperatures of a sample and reference material in the furnace-cell to the desired temperature. During the application of heat, a signal voltage is generated in the temperature indicating means 15 and fed back to the programmer-indicator network for comparison with the program signal. However, inasmuch as slight variations in the heating rate of the furnace-cell as provided by programmer 14 varies the reference temperature of sample and reference materials and leads to erroneous interpretation of test data, the heat-control system must be carefully arranged to provide maximum control of the programmed heating rate in programmer-indicator network 13 without unduly interfering with the sensitivity of comparison-recording network 16 and control and amplifying network 17 serially connected to the furnace-cell 11.

Referring now to FIGURE 2, programmer-indicator network 13 provides a signal voltage proportional to a temperature desired in the furnace-cell by means of programmed changes in the position of wiper arm 20 relative to slidewire resistor 21. Control of the movement of the wiper arm along slidewire 21 is provided by means of a motor 24 connected through a worm gear to the pivot shaft of a cam 25. The cam has a follower mechanically engaged to the wiper arm so rotational movement of the cam is converted to nonlinear rectilinear movement in the arm.

As the wiper moves relative to and in contact with the slidewire, it is to be observed that the signal voltage across the slidewire at the positive side of direct current supply 22 decreases. Thus clockwise rotational movement of arm 20, as viewed, increases the signal level generated at the output of the network by increasing current flow through the wiper arm 20 by way of load resistor 23. To change the zero registry of the slidewire without disturbing the output level of supply 22, the programmer is also provided with a voltage divider comprising serially-connecting resistors 26 and 27 shunting slidewire 21 and connecting by way of two pole switch 28 and conductor 29 to terminal 30 of thermocouple 31. It is to be observed that the resistance of resistors 26 and 27 is approximately 5 percent of that of resistor 23 to allow the supply to be maintained at rated output even as the zero registry of slidewire 21 is varied. Thermocouple 31 is located in an ice-bath and is connected by way of conductor 32 to terminal 30 and by way of conductor 33 to thermocouple 34 located within the furnace. Thermocouple 34 is connected to terminal 35 by way of conductor 36. In order to increase sensitivity, these thermocouples are preferably connected in reverse polarity with respect to the signal voltage provided by the programmer 14. For example, if copper-constantan thermocouples are employed, the conductors 32 and 36 that connect thermocouples 31 and 34 to the negative side of the supply are of a copper material while the conductor 33 connecting the thermocouples is constantan.

While simple proportional control action has been shown to be useful in many control applications, something is left to be desired where DTA measurements are concerned. Moreover, it has been shown in prior art control circuitry for DTA apparatus that the temperature range over which the sample material may be subjected is unduly limited by the circuitry required to generate and control the feedback signal produced at furnace-cell 11. Moreover, in the programmer-indicator network it is desirable that the rate-varying wiper arm 20 of the programmer produce a maximum I.R. drop in traveling the length of slidewire 21 so that each interval of signal voltage is equatable to a given temperature level at the furnace, and at least within a variation of ±.05° C. Yet. it is desirable that the voltage output to the comparison-recording network 16 from the programmer-indicator network 13 be of minimum magnitude in order that variations from a desired signal level may be more easily detected, measured and analyzed.

In accordance with the invention, it is to be noted that these desired characteristics have been incorporated within the programmer-indicator network 13 by connecting thermocouples 31 and 34 to each other in reverse polarity, that is, by connecting the output of these thermocouples in reverse polarity with respect to temperature programmer 14. Thus at a given instant during heating of the furnace, the temperature existing therein is continually compared by means of signals developed by thermocouples 31 and 34 to the signal level developed across the slidewire between the contact point 37 and the end-point 38. If the temperature of the furnace decreases from the value established by the slidewire generally referred to as the control point, the deviation in temperature is detected by the thermocouples, and a signal voltage is produced proportional to the temperature at the input of the comparison-recording network 16 for increasing the signal level at the furnace. Since only the difference in signal level initiates proportional control, slight deviations in control voltage can be closely monitored for better control of the furnace temperature. On the other hand, if the temperature rises above the control point, the voltage output of the programmer-indicator network 13 is of reverse polarity and operates to reduce the heat level at the furnace until the programmer and furnace potentials become equal.

Comparison-recording network 16 includes a conductor 39 that connects contact 40a of slidewire 40 to the wiper arm 20 of slidewire 21. Thus as a signal is produced across slidewire 21, a signal voltage is also produced at slidewire 40 equal to that signal level. But since slidewire 40 is one branch of bridge circuit 41 and connects through resistors 42, 43, 44, 45 and 46 to a direct current supply 47, the voltage at slidewire 40 also produces an unbalanced condition in the other branches of the bridge circuit. To restore balance to the bridge by way of adjusting contact 40a relative to slidewire 40, the network is provided with a circuit-adjusting means such as phase-sensitive amplifier 48 and motor 49. Motor 49 has forward and reverse windings that are selectively energized under the control of the phase sensitive amplifier 48. It is observed that the amplifier is connected to the terminal 35 of the programmer-indicator network 13 by way of conductor 50 and to junction 51 between resistors 43 and 44 by way of conductor 52.

The motor 49 is not only mechanically connected to contact 40a to move it as shown, but also—by suitable mechanical connections designated 55 and 56—

(1) Adjusts the location of indicator 60 relative to a scale 61 and a chart 62 driven by constant speed motor 63 to allow the heat rate of the system to be indicated and recorded and (2) Drives contact 70a of slidewire 70 of control-amplifying network 17.

In the control and amplifying network 17, the slidewire 70 is connected through a resistor 71 to a direct current supply 72. Bridge resistors 73 and 74 shunt the slidewire 70 and form a junction 75 that connects to contact 70a by way of conductors 76 and 77 and potentiometer 78. If there is a signal developed in the comparison-recording network 16 resulting in movement of contact 40a relative to slidewire 40, there is provided movement of contact 70a along slidewire 70 that produces an unbalanced condition in the bridge circuit in control-amplifying network 17. The unbalanced condition results in a signal voltage being applied to the first stage of amplifier 79. There is included in the input circuit of amplifier 79 a capacitor 80 serving as a direct current isolating capacitor. The input circuit also includes a vibrator 81 driven by a coil 82 from a suitable source of alternating current, the capacitor 80 being alternately connected to the upper and lower contacts 91 and 92 of the vibrator. These contacts connect directly across the variable resistor 83 and fixed resistor 84. Consequently, the voltage appearing across these resistors 83 and 84 will correspond with the signal voltage applied to the input of amplifier 79 when vibrator 81 makes contact with contact 91.

Also included in the input circuit are resistor 85 and capacitor 86. The capacitor 86, in conjunction with resistors 83 and 85, forms a differentiating circuit for introducing rate action into the control system, the magnitude of which may be varied by adjusting the capacity of the capacitor 86 and/or the resistance of resistor 83 or resistor 85.

In the output, the amplifier 79 connects by way of a magnetic amplifier generally indicated at 103 to a potentiometer 88. The potentiometer 88 introduces into the input circuit of amplifier 79, by way of capacitor 89 and variable resistor 90, a fractional part of the output signal to introduce reset action into the control system, as explained below.

It is to be observed that the output of amplifier 79 is made up of two control components, one due to proportional action and the other due to rate action. The magnitude of the component of proportional control is provided in two ways, namely, (1) by the relative adjustments of contacts 40a and 70a of slidewires 40 and 70 respectively, or (2) by adjustment of potentiometers 78 and 88 that vary the percentage range over which the output to the amplifier 79 changes. If the former method is used, i.e., by adjustment of contacts 40a and 70a, for a given adjustment of the contact 40a of the control slidewire by the motor 42 there will be a corresponding follow-up adjustment of the slidewire 70. If the voltages respectively applied to slidewires 40 and 70 are equal, a given angular movement of contact 40a will produce an equal angular adjustment of contact 70a. Mathematically, for a given change in the variable characteristic, $\theta$, the adjustment of slidewire contact 70a will be equal to $K_1\theta$, where $K_1$ is a constant. The proportionality may be changed by adjustment of either resistor 42 or 71, FIGURE 2. If resistor 42 is set to make the voltage across slidewire 40 greater than that across slidewire 70 a greater relative movement of contact 70a will be required to equalize the networks. On the other hand, if the latter method is used, i.e., adjustment by potentiometers 78 and 88, it is to be observed that for a given adjustment of the contact 70a, there will be a corresponding change in voltage at the potentiometers 78 and 88. At these potentiometers, the proportionality may be changed by adjustment of the contacts relative to the load resistors in accordance with the proportionality control formula for the variable characteristic, $\theta$, defined above.

When the process is at control point, the potential across resistors 83 and 84 is zero. Thus there is no input to amplifier 79 when the armature of vibrator 81 makes contact with contact 91. However, when the variable characteristic moves off control point, the contact 70a moves in proportion to the change and produces unbalanced signals across the input resistor 84 that are applied at the input of the phase-sensitive amplifier 79.

Rate control action is provided at the input of amplifier 79 by means of capacitor 86 and resistors 83 and 85. Such action is often needed to minimize overshoot, to resist temperature departures from control point, and to head off changes in variable characteristics notwithstanding changes in the resistance of coil 10. The capacitor 86 and the resistance in the circuit provided by resistors 83 and 85 introduce a correction referred to by those skilled in the art as rate action meaning a correction which prevents permanent decrease of offset from the control point of the variable characteristic. Mathematically, the rate action may be expressed by saying that there will be provided a component equal to $$K_3 \frac{d\theta}{dt}$$

where $K_3$ is a constant and $d\theta/dt$ is the time differential of the variable characteristic $\theta$. With the capacitor 86 in the circuit, as the slide-wire 40a is moved by motor 49 to maintain the equality between the circuit across resistors 42 and 43, a signal is produced at amplifier 79 by way of mechanical linkage 56, slidewire 70, conductor 76 and vibrator 81. But due to the fact that the contact 70a is moving along slidewire 70 at a finite rate proportional to the speed at which the upset occurs, there is produced across resistors 83 and 85 a voltage waveform that varies with time. As long as voltage across resistor 85 continues to change, a current flows through resistor 83 charging capacitor 86. Rate action, therefore, produces a rate voltage across resistor 83. This is added to the proportional voltage across resistor 84 and feeds into the input of amplifier 79. The current output contains an added increment equivalent to that demanded by the rate voltage thus producing an additional change in the signal flowing through coil 10. This further adjustment of current output due to rate action is maintained as long as contact 70a is moving, but drops out when it is stationary.

The rate action if excessive may introduce oscillation into the system. For that reason resistors 85 and 87 are positioned in the circuit with capacitor 86 shunting resistor 85 and in series with resistor 87. The rate time is adjustable by means of the variable resistor 83 in the circuit whereby the time constant of the circuit including capacitor 86 is either increased or decreased.

In the output of the amplifier 79, capacitor 89 and resistor 90 introduce a correction referred to by those skilled in the art as reset action, meaning a correction that prevents permanent decrease or offset from the control point of the variable characteristic with rising load. Mathematically, the reset action may be expressed as a correction of magnitude corresponding with the summation with respect to time of the deviation of the characteristic from a predetermined value, i.e., equal to $K_2 \int \theta dt$, where $K_2$ is a constant, $\theta$ is as defined above, and $dt$ is the time-differential increment.

It is to be noted that if the process tends to settle off control point due to a sustained load change, proportional action alone would not return the process to the control point. In order to accomplish control action, automatic reset action is introduced at the input of the vibrator at amplifier 79 by means of capacitor 89. The speed of reset is adjustable by means of variable resistor 90. In detail, with process lagging above or below the control point, a voltage other than zero is produced at the vibrator 81 when the armature contacts terminal 91. By the feedback loop of capacitor 89 and resistor 90, there is provided a voltage across resistor 90 at the terminal 92 of the vibrator. In order that the voltage across resistor 90 be equal and opposite to that introduced at terminal 91, a current must flow through potentiometer 88, charging capacitor 89. As capacitor 89 charges, this current tends to diminish, owing to the accumulation of charge on the capacitor. To keep the charging current flowing, the output current thus must continually change, producing a corresponding change in input, until the voltage at terminal 91 is again zero so that the process is on control point. The input to the process is now determined by the charge on capacitor 89.

The direct current output of amplifier 79 has proportional, rate and reset control components in accordance with the equation, $$V = K_1\theta + K_2\int\theta dt + K_3\frac{d\theta}{dt}$$

where $\theta$ is the deviation of the variable characteristic from the control point, V is the adjustment of the valve or compensating effect in direction to return $\theta$ to the control point, $t$ is time, and $K_1$, $K_2$ and $K_3$ are constants.

This output flows through a control rheostat 100 and control windings 101 and 102 of the magnetic amplifier 103 to control the current passing through the heater coils 10 located within the furnace-cell 11. In order to increase signal level at the coil, there is a saturable reactor indicated at 104 serially connected with output windings 105 of the magnetic amplifier, with output windings 106 of the reactor connecting through heater coil 10 to the positive side of a source of alternating current, as shown. In operation, the secondary voltage of power transformer 107 is applied at the junction of rectifiers 108 and 109 to produce a unidirectional current through control windings 101 and 102 of the magnetic amplifier. These rectifiers are also connected in series with control windings 112 and 113 of saturable core reactor 104 and produce identical unidirectional currents through these windings. The reactance of control windings 101 and 102 of the magnetic amplifier (and hence the direct current output level of the amplifier) are controlled directly by the magnitude of the input signal from amplifier 79 passing through the feedback loop of amplifier 79 by way of the control windings 101 and 102 of magnetic amplifier 103. For low values of current flow through windings 101 and 102, the magnetic core of the magnetic amplifier offers a high reactance and consequently reduces the current flow through the saturable reactor 104 and heater coils 10; on the other hand when a large current flows flows through these windings, a low reactance is presented and a high current flows through the heater coils. The rheostat 100 serially connects with the control windings 101 and 102 to permit matching of the impedances of the magnetic amplifier 103 and phase-sensitive amplifier 79, while resistor 116 in the output of the magnetic amplifier reduces the magnitude of the current flow through the control windings 112 and 113 of the saturable core reactor to a value suitable for use in conjunction with DTA measurements.

The reactor 104 is similar in operation to that of magnetic amplifier 103 except that the output current to the coil 10 is alternating with time. The output windings 106 of the reactor connect between the positive and negative sides of the system supply by way of rectifier 118 and the heater coils 10. Rectifier 118 maintains unidirectional current at control windings 112 and 113 only.

It is to be noted that the reactor 104 and the magnetic amplifier have biasing windings 111, 119 and 120 wound in the same manner as the control windings. These windings are energized by direct current from full-wave rectifier 121 and maintain a small fixed value of negative control current within the magnetic amplifier and the reactor. Resistors 123 and 124 interconnect between the biasing windings and the rectifiers to reduce the output levels from the magnetic amplifier and the reactor to the lowest possible level under conditions of minimum input signal to the control windings.

Winding 110 in the magnetic amplifier 103 is energized by rectifier 122 to provide negative feed-back from the output of the reactor to the magnetic amplifier and thereby maintains a given signal level in the coils 10. Rheostat 125 connects through the full wave rectifier to the biasing windings 110 of the magnetic amplifier to allow adjustment of the feed-back signal level.

*Furnace-sample cell*

In general, in the design of a furnace-sample cell for use in DTA measurements, the thermal characteristics of the cell relative to that of the sample material to be tested are critical. Moreover, the thermal conductivity of the cell should be adequate to provide good heat transfer characteristics from cell to sample, but is preferably not so high that the exotherm or endotherm being sought to be observed is obscured. In addition, it would be desirable that the furnace-sample cell have a certain degree of flexibility to not only have the capability of performing DTA measurements but also have the capability of use in the study of energy-emitting or energy-absorbing characteristics of materials—referred to by those skilled in the art as calorimetric measurements. In calorimetric studies, the characteristics of a sample material are observed by monitoring the energy-emitting (exothermic) or energy-absorbing (endothermic) transitions occurring in the sample.

In adapting a furnace-cell for use in the DTA measurements or in calorimetric studies, the efficiency of heat transfer from the sample to the cell and vice versa must be closely observable. However, several factors are known to adversely affect the efficiency of such heat transfer. Among the most important are (1) the size and shape of test samples, i.e., whether chunk, pellet, powder, etc., and (2) the location of the thermocouples within the sample reference material. Experts in the art have sought to minimize inefficient heat transfer and one of the most successful attempts is described in a recent publication (Differential Thermal Analysis of Organic Samples, E. M. Barrall II and L. B. Rogers, Analytical Chemistry, volume XXXIV, August 1962, pages 1101–10). However, experience has also shown that even using improved furnace-cell designs, measurements of thermal characteristics of many materials, especially newly developed polymers having relatively small amounts of energy interchange, are often in error. The principal factor for such error is thought to be the thermal conductivity across the sample, as, for example, the powder is quite different from the conductivity across the massive material even where the materials are of the same chemical composition. To overcome such variation, attempts have been made to equalize conductivity by (1) diluting the sample with inert material (either solid or liquid) and (2) using the sample in contact with the measuring thermocouple prior to analysis. However, dilution of the sample is unsatisfactory except for polymers having very low heat fusion that can be matched to the diluting agent. In addition, fusion of the sample to the thermocouple has been shown to change the degree of sample crystallinity. Moreover, it is frequently desirable to determine heat of transitions of materials as received, not after a conditioning pretreatment as is necessary and diffusion has been performed. For these reasons, there may be difficulties in correctly calibrating the furnace-sample cell for conventional DTA and calorimetric studies, particularly when such samples are polymers having very low heat diffusion characteristics.

Referring now to FIGURE 3, a furnace-sample cell 11 is shown wherein (1) thermal isolation of the sample from extraneous heat loss or gain from sources not measured by the thermocouples are minimized and (2) calibration is easily achieved for either DTA or calorimetric measurements of materials. In the furnace-cell, there are formed support members for the sample and reference materials that are an integral part of the thermocouple measuring circuits. In that manner differences in heat conductivity and heat loss are averaged over the entire surface of the members so that changes in temperature recorded by the thermocouples truly reflect the thermal conditions of the sample or reference material under measurement.

In more detail, the furnace-sample cell 11 consists of a support 150 on which is seated furnace 151 concentric of sample-reference subassembly 152. The furnace 151 and the subassembly 152 are enclosed within a glass bell housing 153 attached by gaskets to base 150. The gaskets form an air tight seal between the interior and exterior of the bell housing. The bell housing is also provided with openings (not shown) for inserting or removing an atmosphere from the interior in order that operating conditions for which the samples are tested may be varied to extend the capability of the apparatus.

Furnace 151 comprises a cylindrical shell 154 mounted at one end to base 150 and secured thereto by means of circumferentially spaced screws 155. The side wall of the furnace supports a helically wound heating coil 10 extending over the entire length of the furnace. The heating coil connects to control-amplifying network 17 (FIGURE 1) as explained in detail above, and includes an outer metallic sheath 156 separated from an interior conductor 157 by an insulating block 158 preferably formed of a refractory material. The heating element in turn may be enclosed within a cylindrical insulating block (not shown) to insure maximum heat transfer from the coil to the sample-reference subassembly 152. Extending upwardly from base 150 are a series of longitudinal cavities, one of which is indicated at 159 for circulating a cooling fluid through the furnace-cell for the purpose of varying the zero registry of the apparatus over a range from about 25° C. down to −100° C. As indicated, each cavity is serially connected at its ends to neighboring cavities to allow both a parallel and concurrent heat exchange as the fluid passes through the cell. To connect these cavities to the fluid reservoir 18 (FIGURE 1), tubular members 160 and 161 attach through fluid connectors 162 to base 150.

Referring to FIGURES 4 and 5, sample-reference subassembly 152 includes an angular base 165 supported above and insulated from base 150 by a series of ceramic support members 166, 167 and 168, these members being circumferentially spaced about the axis of symmetry of the subassembly. Extending upwardly from base 165 is shield 170 enclosing support members or cuvettes 171, 172 and 173 into which are placed the reference material and the sample material to be tested. These cuvettes are insulated from and supported above base 165 by ceramic rods 174, 175 and 176. As shown in FIGURE 6, each cuvette is preferably cylindrical, has a removable lid 177 and includes a swedged end wall 179 for attachment to its ceramic rod. It is to be observed that if each cuvette is constructed of copper and is connected through a copper conductor of a thermocouple measuring circuit, to be described, for the measurement of the temperature (T) of the sample and the differential temperature ($\Delta T$) between the sample and reference material in the cuvettes, there is no lag between the temperatures recorded of the sample and reference. The conductors pass from the furnace within the interior of the ceramic supports so that heat differences that may exist within the furnace do not affect the temperature registered within the thermocouple measuring circuit. Moreover, the thermocouple measuring circuit is thus seen to include the entire surface of the cuvettes so that any existing temperature differences are effectively averaged over the range of temperatures.

Metal shield 170 is also preferably constructed of copper blackened on the interior surface so that heat is transferred to the cuvettes by thermal radiation only. By using thermal radiation there has been marked improvement in obtaining adiabatic thermal conditions within the furnace-sample cell in that different temperature strata across the furnace are eliminated. Additionally it is to be observed that if the shield is connected through a copper conductor 33 forming a thermocouple 34, FIGURE 2, with conductor 36 for the measurement and control of the heat induced within the furnace, there is greater reliability in the measurement of the furnace-cell temperature. In this regard the thermocouple temperature measuring circuit includes the walls of the shield and thus acts as an averaging means for determining the temperature about which the control heating circuit may be adjusted through proportional, rate and reset control as described above.

*Display and recording circuitry*

The detection of variations in the temperature of the sample and reference material within the furnace-cell 11 is achieved by monitoring the variations in current within thermocouple measuring circuits attached to the furnace cell. As has been previously noted, these circuits include dissimilar conductors attached to the outer peripheries of cuvettes 171, 172 and 173. For convenience of description, these conductors form thermocouples at their connection to the cuvettes and will hereinafter be referred to as sample thermocouple 190, reference thermocouple 191 and auxiliary thermocouple 192 as shown in FIGURE 5. In the description that follows it will be further observed that only thermocouples 190 and 191 need be attached to cuvettes 171 and 172 for operation of the apparatus; however, the remaining thermocouple 192 of the circuit may be used in series with thermocouple 190 where it is desired to simultaneously test metals having different thermal characteristics but using the same heat-control and recording circuitry of the apparatus.

As is well known, thermocouples must be formed of dissimilar metals such as copper and constantan to create a potential difference proportional to the temperature existing between the conductors. For the measurement of temperature, the usual practice is to place the junction point—called a hot junction—of the conductors in the atmosphere to be measured. In addition, if the other end of the two conductors are connected together at a point remote from the hot junction—commonly referred to as cold junction—a potential difference will also be developed along each wire due to temperature gradients. The cold junction is normally held at a fixed temperature by means of an ice bath, so that the thermocouple voltage is determined completely by the temperature at the hot junction. If there is a temperature difference between the hot and cold junction, a current will flow in the circuit proportional to the sum of the potentials, and the strength of this current will indicate the temperature at the hot junction.

Referring to FIGURE 1, the temperature existing at a sample material and the differential temperature between the sample and a reference material within the furnace-cell are detected, amplified and recorded by sample-reference thermocouple network 200 connecting to X–Y recorder 201 through shunted amplifiers 202 and 203, with suppression network 204 being serially connected between amplifier 203 and thermocouple network 200. The thermocouple network 200 includes four thermocouples: sample thermocouple 190 shunting reference thermocouple 191 and ice-bath thermocouples 193a and 193b, see FIGURE 7.

Sample thermocouple 190 is made up of dissimilar insulated conductors 194 and 195 such as copper and constantan respectively connected together to form a hot junction at the cuvette 171 of the furnace-cell supporting the sample material, see FIGURE 4. In more particular detail, the conductor 194 forms the positive side of the thermocouple and connects to the positive side of amplifier 202 by way of conductor 194a, and to the positive side of amplifier 203 by way of conductor 194b. In a similar manner conductor 195 forms the negative side of the thermocouple; connects between ice-bath thermocouples 193a and 193b by way of conductor 195 and connects to reference thermocouple 191 at junction 197.

Reference thermocouple 191 includes dissimilar conductors 198 and 199. Conductor 198 is formed of the same material as conductors 195 and 196; conductor 199 is formed of the same material as conductor 194 and conductors 205 and 207 of ice-bath thermocouples 193a and 193b respectively. Connecting between conductor 205 and the negative side of amplifier 202 is resistor 206. The loop that includes thermocouples 190 and 193b is closed by connecting conductor 207 to the negative side of amplifier 203 by way of suppression network 204.

It is to be observed that thermocouple 190 is arranged to measure both the differential temperature between the sample and reference ($\Delta T$) and the temperature of the system (T). Although such an arrangement is desirable for many applications, it has been shown that where the sample thermocouple is connected as described above for the measurement of the relatively large absolute temperature of the system as well as of very small difference in temperature between the sample and reference materials, the normalized base line for the small difference in temperature $\Delta T$ line on a thermogram produced by X-Y recorder 201 is adversely affected by the magnitude of the absolute temperature.

In accordance with the invention, variations in the normalized base line of the $\Delta T$ temperature during measurement of the sample and reference material, are alleviated by introducing a balanced thermocouple loop that includes the ice-bath thermocouples 193a and 193b and resistor 206, FIGURE 7, in shunt with the sample and reference thermocouples 190 and 191. The purpose of the ice-bath thermocouples 193a and resistor 206 is to balance the signal output over wide ranges of temperature variation for the sample. The mode by which balance is achieved will be more apparent after consideration of FIGURE 8 showing by way of an equivalent circuit the temperature measuring network including thermocouples 190, 191, 193a and 193b.

In FIGURE 8 the potential developed between the dissimilar conductors of the thermocouples are illustrated as shunted batteries 210, 211, 212 and 213 serially connected with load resistance comprising amplifier 202 and 203 and shunt resistance 206. Intermediate of each battery and each load resistance is a resistor 214, 215, 216 or 217 equal to respective lengths of the conductors forming each thermocouple. The following table equates path length along the circuit of FIGURE 7 to the resistance designated in FIGURE 8.

Resistor (FIG. 8):                        Path (FIG. 7)
  214 _____ A'-B'-C'
  215 _____ A'-D'-C'
  216 _____ E'-F'-C'
  217 _____ G'-H'-C'

It can be shown by mathematical analysis that the voltage signal to amplifier 202—directly relating to the difference in temperature between the sample and reference material—is equal to:

$$(V_{211}-V_{212})+\frac{[V_{212}-V_{213}]R_{216}}{Z_{202}}-\frac{[V_{211}-V_{210}]R_{215}}{R_{206}}$$

where:

$V_{211}$ equals the voltage developed across battery 211
$V_{212}$ equals the voltage developed across battery 212
$V_{213}$ equals the voltage developed across battery 213
$V_{210}$ equals the voltage developed across battery 210
$R_{216}$ equals the resistance of resistor 216
$R_{215}$ equals the resistance of resistor 215
$R_{206}$ equals the resistance of resistor 206
$Z_{202}$ equals the input impedance of amplifier 202

Moreover, it is observed that if
(1) Resistor 215 is equal in magnitude to resistor 216, and
(2) Resistor 206 is equal to the input impedance of amplifier 202, the signal voltage applied to the amplifier 202 will depend solely on the voltage difference at the junctions of the thermocouples within the furnace-cell and the ice bath since $[V_{212}-V_{213}]-[V_{211}-V_{210}]=V_{211}-V_{212}$. This voltage difference will be developed solely because of changes in the differential temperature between the sample and reference materials, and is equal to $V_{211}-V_{212}$, as defined above since the ratio $R_{215}/R_{206}$ indicative of the magnitude of error voltage is negligible in practice. Thus since the difference in temperature between the sample and reference materials depends solely on the temperature changes, there is no drift of the thermograms produced at recorder 201 in the endothermic direction during measurement of the thermal characteristics of the sample.

Referring again to FIGURE 7, there is shown in series with ice-bath thermocouple 193b, a zero suppression network 204 for suppressing a given amount of signal voltage developed between conductors 194b and 207 prior to amplification by amplifier 203. The purpose of the suppression network is to increase the relative scanning range of recorder 201 along its abscissa axis without decreasing sensitivity of the recorder. Normally the full scanning range of recorder 201—though limited in both the X and Y direction—is adequate for most DTA measurement. However, for precise determination of peak temperatures when associated with polymer materials, as well as obtaining a sufficiently wide thermogram peak to integrate for calorimetric studies as explained below, some abscissa expansion in the recorder is necessary. When a thermogram is recorded on a time-base structure chart recording system, the necessary expansion is generally obtained by speeding up the chart drive and/or amplifying the temperature signal. Obviously such a solution is impossible with an X-Y system having two varying signal input levels as needed for DTA and calorimetric measurements.

Providing needed range expansion of temperatures along the X axis of recorder 201 is suppression network 204 resembling a modified double bridge circuit and including input potentiometer 220, bridge resistors 221 and 222 and output potentiometers 223 and bridge resistors 224 and 225. The band of the input potentiometer is roughly 0 to 2 millivolts while the band of output potentiometer is roughly 0 to 20 millivolts. Shunting the potentiometer and resistors is regulator voltage supply 226 having a rated output regulated through shunted resistor 227 for bucking a given amount of signal voltage from the thermocouples. Because of the balance determined by the bridge circuit, it has been found that the output voltage of the amplifier 203 can be varied from 0 to 22 millivolts within the resolution of $\pm 1$ millivolt without adversely affecting amplifier or recorder sensitivity.

Connecting to the input and output potentiometers are range switches 230 and 231 connected at the output of amplifiers 203 and 202, respectively, for varying amplifier gain. These switches readjust the limits of the recorder full-scale range so that any range of temperatures of the sample centered about the zero-registry temperature set by way of zero suppression network 204, may be investigated. In practice, any interval of temperatures from −100° C. to 500° C. may be spread over the full-scale range of the recorder.

To appreciate the flexibility of the apparatus in accordance with the invention, a brief description follows of the steps used in attaining calorimetric characteristics of the sample materials using the apparatus. In calorimetric studies, the thermograms previously obtained by DTA measurement are used to determine the amount of heat either liberated or absorbed during changes in phase of the sample material. In order to use these thermograms for calorimetric studies it is first necessary to realize that any DTA thermogram is directly proportional to the magnitude of the heat of melting of the material. That is to say, the area of each DTA thermogram defined between the base-line of the ΔT temperature coordinate and the wiggly line indicating deviation from that line because of a phase transition of the material, is proportional to the heat of melting of the material. However, prior to the present invention, in order to precisely determine that relationship, the furnace-cell had to be normalized to a heat rate used in the DTA measurement. This necessitated that an operator determine the magnitude of the error in the thermogram area associated with a given furnace-cell and heat rate. These normalizing procedures were necessarily long and tedious and moreover involved the following steps:

(1) Heating a material having a known heat of melting at, say, five different heating rates, (2) Recording the phase transition of the material by monitoring the DTA temperatures, i.e., the ΔT and T temperatures of the sample and the reference material, for each of the heating rates, (3) Intergrating each thermogram obtained to determine what percent of the plot lies between the base-line of the ΔT temperature coordinate and the wiggly line indicating deviations from that coordinate as the sample undergoes phase transitions, (4) Plotting the known heat of melting (usually in calories) as a function of the integrated area of each thermogram for each heating rate, (5) Determining from the plot what percentage of *area* of each thermogram is error by extrapolating the plot to a zero heat rate and correcting the plot of step (4), (6) Normalizing the heat of melting of the sample by the corrected integrated area of the plot of step (4), and (7) Plotting values of the normalized heat of melting per integrated area of thermograms as a function of heat rate.

Thereafter if a material having an unknown heat of melting is heated at one of the heating rates for which normalizing data has been obtained, the heat of melting of the material is obtained by (1) integrating the obtained DTA thermogram, followed by (2) multiplying the integrated area by the heat of melting per unit area of the normalization obtained in step (7) above.

However, it has been found that even if great care is taken in obtaining the normalizing data of the furnace-cell there is often error in using such data with new samples having different phase transitional temperatures. Moreover the complexity of the steps of normalizing were such that automatic equipment could not be used to both obtain normalized data of the furnace-cell and analyze sample materials by means of such data.

In accordance with the invention, it has been found that determination of the error area of each thermogram by extrapolation during the normalizing procedure for a given furnace-cell, i.e., step (5) above, is not necessary if the furnace-cell in accordance with the invention is used in determining the thermal characteristics of the sample. Moreover, the furnace-cell—because of construction details hereinbefore described—has no temperature lag between the sample and the reference owing to the fact that heating of these materials is by radiation and the thermocouple circuit for measuring their temperatures includes all surfaces of the cuvettes supporting the materials.

In addition, it has been discovered that it is desirable to perform the normalizing procedure of a furnace-sample cell not with a single sample of known heat of melting, but with a group of known materials having different temperatures at which phase transitions occur. In addition, it has been found desirable to store the data by way of computer circuitry for later analysis of sample materials having unknown heats of melting. That is to say, the furnace-sample cell has been found to be best normalized by the steps of:

(1) Sequentially heating each of a series of materials having known specific heats of melting occurring by different phase transition temperatures at, say, five different heating rates each, (2) Recording the phase transitions of these materials by monitoring the ΔT and T temperatures of the sample and a reference at each heating rate, (3) Integrating each thermogram thus obtained to determine what percent of the plot lies between the base-line of the ΔT temperature coordinate and the wiggly line indicating deviation from that line as the sample undergoes a phase transition, (4) Normalizing the known heat of melting of the samples by the integrated area of each thermogram obtained at each given heat rate, and (5) Storing the normalized values of step (4) of each sample as a function of the temperature of the DTA peak for the heating rates used in steps (1) through (4).

Thereafter, if a material having an unknown heat of melting is heated at one of the heating rates for which normalizing data has been obtained, the heat of melting is automatically obtained by (a) integrating the obtained DTA thermogram obtained for that material followed by (b) multiplying the integrated area by the normalizing values of heat of melting per area of thermogram obtained by steps (3), (4) and (5) *at the heat rate* and *at the temperature of a DTA peak* identical to those obtained for the material having the unknown heat of melting.

The circuitry for performing these steps automatically is well known to those skilled in the art. For example, the circuitry for providing the normalizing data for a furnace-cell is obtained by equipment and circuitry disclosed by this application; by circuitry described and claimed in U.S. Patent No. 3,259,733, filed Feb. 24, 1961, "Automatic Integrator for Chromatograph Records," R. F. Klaver et al., assigned to the assignee of this application; and by computer circuitry having inherent function-generating means for storage of such normalizing data. In using the function-generating data of the computer circuitry to determine the heat of melting of an unknown sample, the circuitry is likewise well-known in the art and includes the equipment and circuitry of this application in combination with additional input circuitry to the computer wherein the function-generating means is varied by the information content received from the input circuit. Moreover, the information thus received usually relates to (1) the area of integration of the thermogram of the unknown sample, (2) the heat rate used in producing the thermogram, and (3) the temperature of the phase transition of the thermogram where integration is performed.

While certain preferred embodiments of the invention have been specifically disclosed, it should be understood that the invention is not limited thereto as many variations will be readily apparent to those skilled in the art and the invention is to be given its broadest possible interpretation within the following claims.

We claim:

1. An apparatus for the determination of thermal characteristics of a material by means of differential thermal analysis, comprising:

(a) a furnace-cell for enclosure of a sample of said material and an inert reference material, said furnace-cell including an electrical coil adapted to heat said materials, (b) means for generating a first signal voltage varying in magnitude in accordance with a predetermined program to heat said materials, (c) means for generating a second signal voltage having a magnitude proportional to the temperature of said furnace-cell, said second signal voltage being of reverse polarity with respect to that of said first signal, (d) a balancing network for comparing said first and second signals and adapted to be unbalanced in accordance with the sum of said signals, said network including compensating means and drive means connected to said compensating means for repositioning said compensating means to rebalance said network by producing a third signal voltage equal in magnitude to the sum of said first and second signals, (e) a second balancing network mechanically linked to said compensating means of said first network to produce an electrical characteristic that varies in accordance with the magnitude of said third signal for rebalancing said compensating means, said second network including a rate resistor and a rate capacitor for producing a compensating adjustment of said electrical characteristic in accordance with the rate of change of said characteristic, a reset-capacitor to produce another compensating adjustment of said characteristic as changes occur in the resistivity of said electrical coil in said furnace-cell, and means for generating a current proportional to and controllable by said electrical characteristic and passing said current through said electrical coil, (f) means for measuring the temperature of the sample and the differential temperature between the sample and the reference material by producing fourth and fifth signal voltages proportional to said temperatures respectively, and (g) means for recording said fourth and fifth signal voltages to produce a record of the differential temperature between said sample and said reference as a function of the temperature of said sample.

2. An apparatus for the determination of thermal characteristics of a material by means of differential thermal analysis, comprising:

(a) a furnace-cell for enclosure of a sample of said material and an inert reference material, said furnace-cell including an electrical coil adapted to heat said materials, a metallic shield disposed within and heat conductively isolated from said electrical coil, and at least two metallic cuvettes disposed within and heat conductively isolated from said shield and said electrical coil for supporting said sample and said reference material, (b) means for generating a first signal voltage varying in magnitude in accordance with a predetermined program to heat said materials, (c) means for generating a second signal voltage having a magnitude proportional to the temperature of said furnace-cell, said second signal voltage being of reverse polarity with respect to that of said first signal, (d) a balancing network for comparing said first and second signals and adapted to be unbalanced in accordance with the sum of said signals, said network including compensating means and drive means connected to said compensating means for repositioning said compensating means to rebalance said network by producing a third signal voltage equal in magnitude to the sum of said first and second signals, (e) a second balancing network mechanically linked to said compensating means of said first network to produce an electrical characteristic that varies in accordance with the magnitude of said third signal for rebalancing said compensating means, said second network including a rate resistor and a rate capacitor for producing a compensating adjustment of said electrical characteristic in accordance with the rate of change of said characteristic, a reset-capacitor to produce another compensating adjustment of said characteristic as changes occur in the resistivity of said electrical coil in said furnace-cell, and means for generating a current proportional to and controllable by said electrical characteristic and passing said current through said electrical coil, (f) means for measuring the temperature of the sample and the differential temperature between the sample and the reference material by producing fourth and fifth signal voltages proportional to said temperatures respectively, and (g) means for recording said fourth and fifth signal voltages to produce a record of the differential temperature between said sample and said reference as a function of the temperature of said sample.

3. The apparatus of claim 2 wherein said means for generating said second signal voltage proportional to the temperature of said furnace-cell comprises thermocouple means having first and second metallic conductors serially attaching to said shield of said furnace-cell, said first conductor and shield being formed of similar materials to increase the temperature-detection capability of said thermocouple means.

4. The apparatus of claim 2 wherein said means for measuring the temperature of said sample and the differential temperature between said sample and said reference material comprises first, second, third and fourth thermocouples arranged in shunt for producing signal voltages proportional to said temperatures.

5. The apparatus of claim 4 wherein said first thermocouple is attached to a cuvette containing said inert material in said furnace-cell and said second thermocouple is disposed within a constant-temperature environment and serially connected to said first thermocouple by way of a resistor having a resistivity equal to that of said recording means indicating the differential temperature between said sample and said reference.

6. The apparatus of claim 2 in which said means for recording said fourth and fifth voltages proportional to the temperature of the sample and the differential temperature between said sample and said reference material comprises a recorder responsive to said means producing said fourth and fifth signal voltages, means serially connected between said fourth and fifth signal producing means and said recorder for amplifying said fourth voltage proportional to the temperature of said sample, suppression means serially connected between said amplifying means for said fourth voltage and said fourth and fifth signal producing means, switch means serially connected between said fourth voltage amplifying means and said recorder, means shunting said fourth voltage amplifying means for amplifying said fifth voltage proportional to the differential temperature between said sample and said reference material, and switch means serially connected between said amplifying means for said fifth voltage and said recorder.

7. The apparatus of claim 6 wherein said suppression means comprises a bridge network for producing a suppression voltage of reverse polarity across said fourth voltage amplifying means to that of said fourth voltage proportional to the temperature of said sample.

8. The apparatus of claim 1 including separate means for recording said third signal adapted to control said electrical current in said electrical coil as a function of time whereby the heating rate of said furnace-cell is indicated and recorded.

9. The apparatus of claim 1 in which said means for recording said fourth and fifth voltages, respectively, proportional to the temperature of the sample and the differential temperature between the sample and the reference material, comprises a recorder for providing a record of the differential temperature as a function of sample temperature, means serially connected to said recorder for separately amplifying said fourth and fifth voltages, suppression means serially connected between said amplifying means and said producing means for controllably suppressing a portion of said fourth voltage to provide range expansion for said recorder.

10. An apparatus for the determination of thermal characteristics of a material by means of differential thermal analysis, comprising:
  (a) a furnace-cell for enclosure of a sample of said material and an inert reference material, said furnace-cell including an electrical coil adapted to heat said materials,
  (b) means for generating a first signal voltage varying in magnitude in accordance with a predetermined program to heat said materials,
  (c) means for generating a second signal voltage proportional to the temperature of said furnace-cell, said second signal voltage being of reverse polarity with respect to that of said first signal,
  (d) a control network for comparing said first and second signals and adapted to produce a third signal in accordance with the sum of said signals to control an electrical current serially connected to said electrical coil, said network including means for providing proportional, rate and reset action to said third signal,
  (e) means for measuring the temperature of said sample and the differential temperature between said sample and said reference material by producing fourth and fifth signal voltages proportional to said temperatures respectively, said means including at least a sample thermocouple, a reference thermocouple, and compensating means connectible between said sample and reference thermocouples, said sample thermocouple adapted to singly provide said fourth voltage proportional to the voltage of said sample and to provide, in combination with said reference thermocouple said fifth voltage proportional to the differential temperature, and
  (f) means for recording said fourth and fifth voltages to provide a record of the differential temperature between said sample and recorder as a function of the temperature of said sample, said recording means including a recorder and amplifying means for separately amplifying said produced fourth and fifth voltages interconnected between said recorder and said fourth and fifth voltage producing means,
  (g) said compensating means of said sample and reference temperature measuring means adapted to develop a balancing signal voltage between said sample and reference thermocouples so as to reduce error in said fifth voltage due to measuring said fourth and fifth voltages by means of a single thermocouple, said compensating means including resistor means connectible between said sample and reference thermocouple having a resistivity substantially equal to that of said amplifying means for amplifying said fifth voltage.

11. In an apparatus for the determination of thermal characteristics of a sample material by means of differential thermal analysis, a furnace-cell comprising:
  (a) a furnace adapted to heat said sample material and a reference material at a controllable rate;
  (b) a sample-reference cell assembly for supporting said materials in heat transfer contact with said furnace; and
  (c) said cell assembly including:
    (1) shield means forming an enclosure;
    (2) at least first and second metallic cuvettes within said shield means, said first cuvette supporting said sample material and said second cuvette supporting said reference material;
    (3) means for supporting said cuvettes in heat conductive isolation relative to said shield means; and
    (4) thermocouple means attachable to said cuvettes for measuring thermal characteristics of said sample and said reference materials, said thermocouple means including at least a sample thermocouple attachable to said first cuvette, a reference thermocouple attachable to said second cuvette, and compensating means external of said furnace-cell connected to said sample and reference thermocouples for reducing the error associated with measuring both sample and differential temperatures of said sample and reference materials by means of a single thermocouple, said compensating means including resistor means between said sample and reference thermocouples having a predetermined resistivity to reduce said error.

12. An apparatus for the determination of thermal characteristics of a material by means of differential thermal analysis, comprising:
  (a) a furnace-cell for enclosure of a sample of said material and an inert reference material, said furnace-cell including an electrical coil adapted to heat said materials, a metallic shield disposed within and heat conductively isolated from said electrical coil, and at least two metallic cuvettes disposed within and heat conductively isolated from said shield and said electrical coil to support said sample and reference materials,
  (b) means for generating a first signal voltage varying in magnitude in accordance with a predetermined program to heat said materials,
  (c) means for generating a second signal voltage proportional to the temperature of said furnace-cell, said second signal voltage being of reverse polarity with respect to that of said first signal,
  (d) a control network for comparing said first and second signals and adapted to produce a third signal in accordance with the sum of said signals to control an electrical current serially connected to said electrical coil, said network including means for providing proportional, rate and reset action to said third signal,
  (e) means for measuring respectively the temperature of said sample and the differential temperature between said sample and said reference material by producing fourth and fifth signal voltages proportional to said temperatures respectively; said measuring means comprising first, second, third and fourth thermocouples arranged in shunt for producing said fourth and fifth signal voltages proportional to said temperatures; said first thermocouple being attached to a cuvette containing said inert reference material in said furnace cell, said second thermocouple being disposed within a constant-temperature environment and serially connected to said first thermocouple by way of a resistor adapted to increase the accuracy of said measuring means, and
  (f) means for recording said fourth and fifth voltages to provide a record of the differential temperature between said sample and reference as a function of the temperature of said sample, said recording means responding to said fifth voltage having a resistivity equal to that of said resistor connected between said first and second thermocouples.

13. An apparatus for the determination of thermal characteristics of a material by means of differential thermal analysis, comprising:
  (a) a furnace-cell for enclosure of a sample of said material and an inert reference material, said furnace-cell including an electrical coil adapted to heat said materials, a metallic shield disposed within and heat conductively isolated from said electrical coil, and at least two metallic cuvettes disposed within and heat conductively isolated from said shield and said electrical coil, to support said sample and reference materials, (b) means for generating a first signal voltage varying in magnitude in accordance with a predetermined program to heat said materials, (c) means for generating a second signal voltage proportional to the temperature of said furnace-cell, said second signal voltage being of reverse polarity with respect to that of said first signal, (d) a control network for comparing said first and second signals and adapted to produce a third signal in accordance with the sum of said signals to control an electrical current serially connected to said electrical coil, said network including means for providing proportional, rate and reset action to said third signal, (e) means for measuring respectively the temperature of said sample and the differential temperature between said sample and said reference material by producing a fourth signal voltage proportional to the temperature of said sample, and a fifth signal voltage proportional to the differential temperature between said sample and reference materials, and (f) means for recording said fourth and fifth voltages to provide a record of the differential temperature between said sample and reference materials as a function of the temperature of said sample, said recording means comprising a recorder responsive to said means producing said fourth and fifth signal voltages, means serially connected between said fourth and fifth signal producing means and said recorder for amplifying said fourth voltage, suppression means serially connected between said amplifying means and said fourth and fifth signal producing means, switch means serially connected between said fourth voltage amplifying means and said recorder, means shunting said fourth voltage amplifying means for amplifying said fifth voltage, and switch means serially connected between said fifth voltage amplifying means and said recorder.

14. The apparatus of claim 13 wherein said suppression means comprises a bridge network for producing a suppression voltage across said fourth voltage amplifying means, said suppression voltage being of reverse polarity to that of said fourth voltage so as to suppress a portion of said fourth voltage and thereby expand the range of said recorder.

15. An apparatus for the determination of thermal characteristics of a material by means of differential thermal analysis, comprising:

(a) a furnace-cell for enclosure of a sample of said material and an inert reference material, said furnace-cell including an electrical coil adapted to heat said materials, (b) means for generating a first signal voltage varying in magnitude in accordance with a predetermined program to heat said materials, (c) means for generating a second signal voltage proportional to the temperature of said furnace-cell, said second signal voltage being of reverse polarity with respect to that of said first signal, (d) a control network for comparing said first and second signals and adapted to produce a third signal in accordance with the sum of said signals to control an electrical current serially connected to said electrical coil, said network including means for providing proportional, rate and reset action to said third signal, (e) means for measuring the temperature of said sample and the differential temperature between said sample and said reference material by producing fourth and fifth signal voltages proportional to said temperatures respectively, said signal producing means including at least a sample thermocouple and at least a reference thermocouple connectable to said amplifying means, said sample thermocouple adapted to singly provide said fourth voltage proportional to the temperature of said sample and to provide, in combination with said reference thermocouple, said fifth voltage proportional to the differential temperature, and (f) means for recording said fourth and fifth voltages to provide a record of the differential temperature between said sample and reference, as a function of the temperature of said sample; said recording means including a recorder, amplifying means interconnecting said fourth and fifth voltage producing means and said recorder for separately amplifying said produced fourth and fifth voltages, and suppression means interconnecting said sample thermocouple and said amplifying means for suppressing a portion of said fourth voltage proportional to said sample temperature to thereby expand the scale of said recorder.

16. An apparatus for the determination of thermal characteristics of a material by means of differential thermal analysis, comprising:

(a) a furnace-cell for enclosure of a sample of said material and an inert reference material, said furnace-cell including an electrical coil adapted to heat said materials, (b) means for generating a first signal voltage varying in magnitude in accordance with a predetermined program to heat said materials, (c) means for generating a second signal voltage proportional to the temperature of said furnace-cell, said second signal voltage being of reverse polarity with respect to that of said first signal, (d) a control network for comparing said first and second signals and adapted to produce a third signal in accordance with the sum of said signals to control an electrical current serially connected to said electrical coil, said network including means for providing porportional, rate and reset action to said third signal, (e) means for measuring the temperature of said sample and the differential temperature between said sample and said reference material by producing fourth and fifth signal voltages proportional to said temperatures respectively, and (f) means for recording said fourth and fifth voltages to provide a record of the differential temperature between said sample and reference as a function of the temperature of said sample; said recording means including a recorder for providing a said record of differential temperature as a function of sample temperature, means serially connected to said recorder for separately amplifying said fourth and fifth voltages, suppression means serially connected between said amplifying means and said fourth and fifth signal producing means for controllably suppressing a portion of said fourth voltage to provide range expansion for said recorder.

17. An apparatus for the determination of thermal characteristics of a material by means of differential thermal analysis, comprising:

(a) a furnace-cell for enclosure of a sample of said material and an inert reference material, said furnace-cell including an electrical coil adapted to heat said materials, (b) means for generating a first signal voltage varying in magnitude in accordance with a predetermined program to heat said materials, (c) means for generating a second signal voltage proportional to the temperature of said furnace-cell, said second signal voltage being of reverse polarity with respect to that of said first signal, (d) a control network for comparing said first and second signals and adapted to produce a third signal in accordance with the sum of said signals to control an electrical current serially connected to said electrical coil, said network including means for providing proportional, rate and reset action to said third signal, (e) means for measuring the temperature of said sample and the differential temperature between said sample and said reference material by producing fourth and fifth signal voltages proportional to said temperatures respectively, said measuring means comprising first, second, third and fourth thermocouples for producing said fourth and fifth signal voltages proportional to the temperature of said sample and the differential temperature between said sample and said reference material respectively, said first thermocouple being attached in detecting contact with said inert reference material in said furnace-cell, said second thermocouple being disposed within a constant low-temperature environment and serially connected to said first thermocouple by way of a resistor, said third thermocouple being attached in detecting contact with said sample in said furnace-cell, said fourth thermocouple being disposed within a constant low-temperature environment, said first and third thermocouples being interconnected to develop said fifth voltage proportional to said differential temperature, said third and fourth thermocouples being interconnected to develop said fourth voltage proportional to said sample temperature, and said first and second thermocouples being interconnected to develop a compensating voltage to reduce error in said fifth voltage due to the effect of measuring both said fourth and fifth voltages by a single thermocouple, and (f) means for recording said fourth and fifth voltages to provide a record of the differential temperature between said sample and reference materials as a function of the temperature of said sample.

18. The apparatus of claim 17 wherein said second and third thermocouples are formed of conductors whose resistivities are equal and said resistor serially connected between said first and second thermocouples is adapted to have a resistivity equal to that of said recording means responding to said fifth voltage proportional to said differential temperature.

References Cited

Mazieres: "Micro and Semimicro DTA," in Analytical Chemistry, 36 (3): pp. 602–605. March 1964.

Barral, E. M., et al.: "DTA of Organic Samples," in Analytical Chemistry, 34 (9): pp. 1101–1106, August 1962.

Mazieres: In Annales de Chimie, pp. 575–586, May–June, 1961.

Masieres: In Academie des Sciences Comptes Rendus 248 (21): pp. 2990–2992, May 25, 1959.

Muller, R. H.: "DTA," in Analytical Chemistry, 35 (4): pp. 103A–104A, April 1963.

Clampitt, B. H.: "DTA of Linear Polyethylene-High Pressure Polyethylene Blends," in Analytical Chemistry, 35 (4); pp. 577–579, April 1963.

Bombaugh, K. J., et al.: "Investigation of Comonomer Distribution in Ethylene-Acrylate Copolymers With Thermal Methods," in Analytical Chemistry, 35 (12): pp. 1834–1837, November 1963.

Garn, P. D., et al.: "Analytical Applications of a DTA Apparatus," in Analytical Chemistry, 29 (2): pp. 271–275, February 1957.

Vassallo, D. A., et al.: "Precise Phase Transition Measurements of Organic Materials by DTA," in Analytical Chemistry, 34 (1): pp. 132–135, January 1962.

Chin, Jr.: "Identification of Organic Compounds by Differential Thermal Dynamic Analysis," in Analytical Chemistry, 34 (13): pp. 1841, 1843, December 1962.

JAMES J. GILL, *Acting Primary Examiner.*

RICHARD C. QUEISSER, *Examiner.*

J. C. GOLDSTEIN, C. A. RUEHL, *Assistant Examiners.*